(12) United States Patent
Ballentin et al.

(10) Patent No.: US 8,081,689 B2
(45) Date of Patent: Dec. 20, 2011

(54) METHOD FOR PERFORMING FREQUENCY SELECTIVE CONTROL CHANNEL SCHEDULING IN NETWORKS USING AN OFDM SPECTRUM, A BASE STATION, A MOBILE TERMINAL AND A NETWORK THEREFOR

(75) Inventors: Ralph Ballentin, Birkenwerder (DE); Stephen Kaminski, Eislingen (DE); Hajo Bakker, Eberdingen (DE); Chan Zhou, Berlin (DE); Gerhard Wunder, Berlin (DE)

(73) Assignee: Alcatel Lucent, Paris (FR)

( * ) Notice: Subject to any disclaimer, the term of this patent is extended or adjusted under 35 U.S.C. 154(b) by 1172 days.

(21) Appl. No.: 11/640,286

(22) Filed: Dec. 18, 2006

(65) Prior Publication Data
US 2007/0153929 A1    Jul. 5, 2007

(30) Foreign Application Priority Data
Jan. 3, 2006   (EP) .................................... 06290023

(51) Int. Cl.
*H04K 1/10* (2006.01)
(52) U.S. Cl. ...................................... 375/260; 375/259
(58) Field of Classification Search .................. 375/260; 370/69.1; 455/59
See application file for complete search history.

(56) References Cited

U.S. PATENT DOCUMENTS

| | | | |
|---|---|---|---|
| 6,511,280 B1* | 1/2003 | Sammartino et al. | 414/784 |
| 6,947,748 B2* | 9/2005 | Li et al. | 455/450 |
| 7,164,669 B2* | 1/2007 | Li et al. | 370/336 |
| 7,177,298 B2* | 2/2007 | Chillariga et al. | 370/348 |
| 7,209,460 B2* | 4/2007 | Fitzek et al. | 370/329 |
| 2003/0215021 A1 | 11/2003 | Simmonds | |
| 2006/0018268 A1* | 1/2006 | Kakani et al. | 370/278 |

(Continued)

FOREIGN PATENT DOCUMENTS

EP    1 246 423 A    10/2002

OTHER PUBLICATIONS

Haustein, Tet al.( "Interpolation and noise reduction in MIMO-OFDM—a complexity driven perspective", IEEE Transaction in Signal Processing and Its Applications, 2005. Proceedings of the Eighth International Symposium on vol. 1, Aug. 28-31, 2005 pp. 143-146.*

(Continued)

*Primary Examiner* — Shuwang Liu
*Assistant Examiner* — Helene Tayong
(74) *Attorney, Agent, or Firm* — Fay Sharpe LLP

(57) ABSTRACT

The invention concerns a method for performing frequency selective control channel scheduling in networks using an OFDM spectrum, whereby a base station (BS1-BS8) broadcasts on at least one predefined subcarrier which is known to all mobile terminals (T1-T4) a signaling information common to all mobile terminals (T1-T4) indicating the position of at least one subcarrier of at least one frequency selective shared control channel and at least one identification of at least one addressed mobile terminal, the base station (BS1-BS8) sends signaling information for said at least one addressed mobile terminal at the indicated position of said at least one subcarrier of said at least one frequency selective shared control channel, and at least one mobile terminal (T1-T4) measures at least one subcarrier of said at least one frequency selective shared control channel for channel quality estimation, a base station (BS1-BS8), a mobile terminal (T1-T4) and a network (CN) therefor.

15 Claims, 2 Drawing Sheets

U.S. PATENT DOCUMENTS

| | | | |
|---|---|---|---|
| 2007/0064669 A1* | 3/2007 | Classon et al. | 370/347 |
| 2007/0076677 A1* | 4/2007 | Batariere et al. | 370/342 |
| 2007/0097981 A1* | 5/2007 | Papasakellariou | 370/394 |
| 2007/0230431 A1* | 10/2007 | Driesen et al. | 370/345 |
| 2009/0092037 A1* | 4/2009 | Hadad | 370/207 |
| 2010/0226453 A1* | 9/2010 | Wang et al. | 375/260 |

OTHER PUBLICATIONS

Simeone: "Adaptive Pilot Pattern for OFDM system" IEEE International Conference on Communications, vol. 2, Jun. 20, 2004, pp. 978-982, XP010701008.

* cited by examiner

METHOD FOR PERFORMING FREQUENCY SELECTIVE CONTROL CHANNEL SCHEDULING IN NETWORKS USING AN OFDM SPECTRUM, A BASE STATION, A MOBILE TERMINAL AND A NETWORK THEREFOR

The invention is based on a priority application EP 06 290 023.8 which is hereby incorporated by reference

BACKGROUND OF THE INVENTION

The invention relates to a method for performing frequency selective control channel scheduling in networks using an OFDM spectrum according to the preamble of claim 1, a mobile terminal according to the preamble of claim 9, a base station according to the preamble of claim 10, and a network according to the preamble of claim 11.

Orthogonal Frequency Division Multiplexing (OFDM) radio systems are currently under discussion in many places as e.g. in 3GPP Technical Specification Group (TSG) Radio Access Network (RAN1).

OFDM is a multi-carrier modulation technique. The data is divided among a large number of closely spaced subcarriers. Several bits of a bit stream are mapped on one subcarrier by modulating the complex amplitude by e.g. QPSK (QPSK=Quadrature Phase Shift Keying), 16-QAM or 64-QAM (QAM=Quadrature Amplitude Modulation).

Frequency-selective resource allocation algorithms such as adaptive modulation, subcarrier allocation and power control can enhance the performance of OFDM downlink systems. According to channel conditions which are reported from a mobile terminal as e.g. a UE (User Equipment) to a base station as e.g. a Node B the resources can be optimally distributed to achieve maximal throughput.

In the legacy OFDM systems such as WLAN (WLAN=Wireless Local Area Network) the resource scheduling is performed on a frequency non-selective basis. Therefore, there is no need to measure the channel conditions frequency selective in WLAN systems. The Signal-to-Interference Ratio measurement as the basis for channel quality estimation in High Speed Downlink Packet Access (HSDPA) using Code Division Multiple Access (CDMA) is frequency independent, too.

A radio access network in which a frequency selective resource scheduling will be implemented is described in the technical report 3GPP TR 25.813 V0.1.0 (2005-11).

The object of the invention is thus to estimate the channel conditions dependent on the frequency to allow for frequency-selective resource allocation in networks using an OFDM spectrum.

This object is achieved by a method according to the teaching of claim 1, a mobile terminal according to the teaching of claim 9, a base station according to the teaching of claim 10, and a network according to the teaching of claim 11.

The main idea of the invention is to provide a mobile terminal with coded signals on several subcarriers to perform a measurement of the channel conditions without blocking extra resources for data transmission. More precisely, the mobile terminal has to measure the channel conditions, e.g. in the form of a Signal-to-Interference Ratio (SIR) or based on path loss measurements, on several predefined subcarriers, and in order not to spend extra frequency resources for the measurement of channel conditions, it is proposed to use for this purpose a frequency selective shared control channel with a special signaling structure. Such a frequency selective shared control channel only uses dedicated OFDM symbols or subcarriers that are chosen based on the channel quality. Preferably, this special structure guarantees a multiple use of the frequency selective shared control channel for signaling and for data transmission.

Further developments of the invention can be gathered from the dependent claims and the following description.

BRIEF DESCRIPTION OF THE DRAWINGS

In the following the invention will be explained further making reference to the attached drawings.

DETAILED DESCRIPTION OF THE INVENTION

A multi cell network in which the invention can be implemented comprises mobile terminals and base stations.

Each of said mobile terminals is connected to one or multiple of said base stations, and the base stations are in turn connected to a core network.

Figure 1:
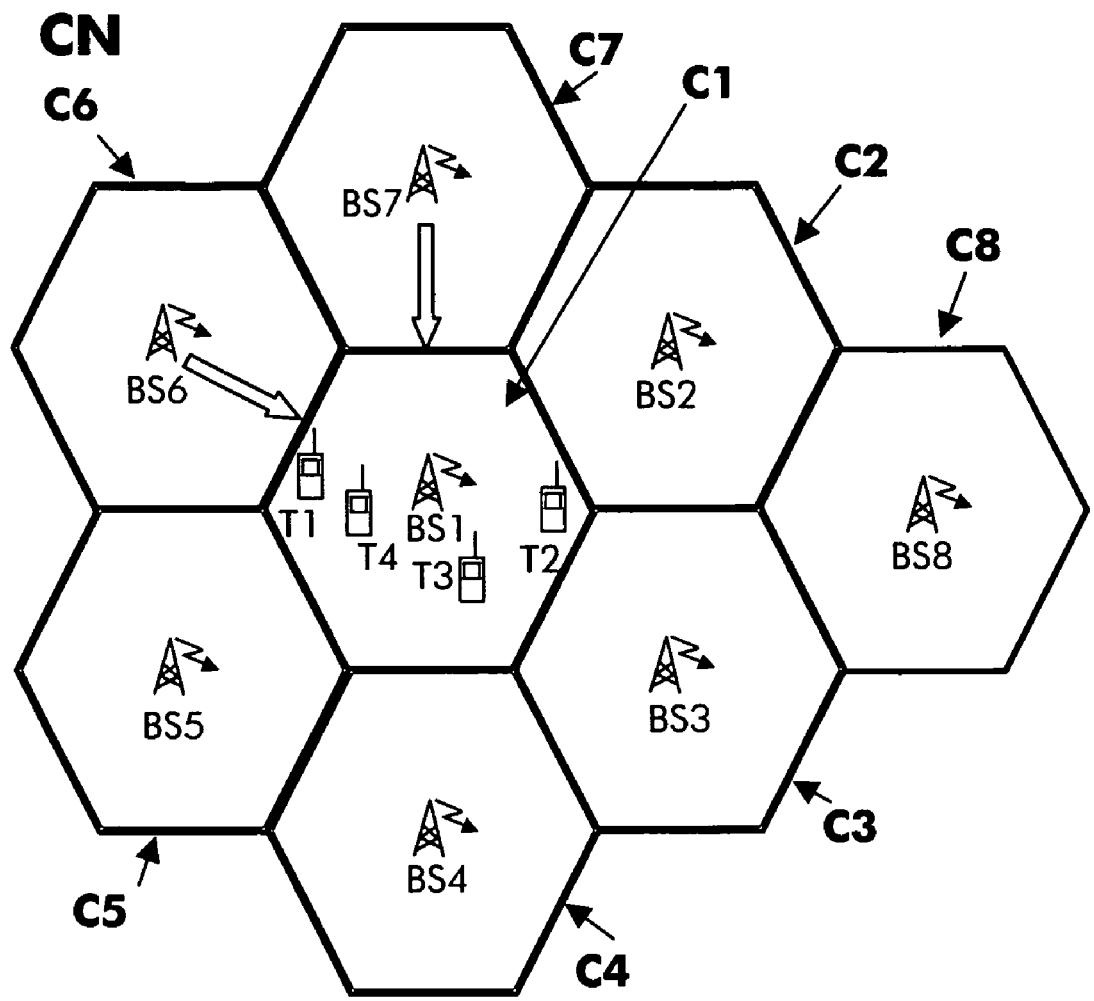
FIG. 1 schematically shows a multi cell network in which the invention can be implemented.

The multi cell network CN depicted in FIG. 1 is exemplarily divided in 8 cells C1-C8 and comprises exemplarily 8 base stations BS1-BS8 and 4 mobile terminals T1-T4.

Each of the 8 base stations BS1-BS8 serves their respectively assigned cell C1-C8 and provides for data exchange of mobile terminals T1-T4 that are located within their respectively assigned cell C1-C8.

For the sake of simplicity, the connections of the base stations BS1-BS8 to further elements of the multi cell network, as e.g. controllers, are not depicted in FIG. 1.

The radio connections between the mobile terminals T1-T4 and their serving base station BS1 are disturbed by interferences from neighboring base stations BS2-BS8, which is indicated exemplarily by two broad arrows in the cells BS6 and BS7. Moreover, said radio connections are disturbed by fading caused e.g. by reflections.

The mobile terminals T1-T4 comprise the functionality of a mobile terminal for transmission and reception in a communication network as e.g. an OFDM network, i.e. they can be connected to a communication network by means of a base station.

Furthermore, a mobile terminal T1-T4 according to the invention comprises means for evaluating a signaling information common to all mobile terminals broadcast by a base station indicating the position of at least one OFDM symbol or subcarrier of a frequency selective shared control channel and at least one identification of at least one addressed mobile terminal, and the mobile terminal T1-T4 comprises means for measuring said at least one OFDM symbol or subcarrier of said frequency selective shared control channel for channel quality estimation.

The base stations BS1-BS8 comprise the functionality of a base station of a communication network as e.g. a WLAN or an OFDM network, i.e. they provide the possibility for mobile terminals T1-T4 to get connected to the multi cell network CN.

Furthermore, a base station BS1-BS8 according to the invention comprises means for broadcasting on at least one OFDM symbol or subcarrier a signaling information common to all mobile terminals T1-T4 indicating the position of at least one OFDM symbol or subcarrier of a frequency selective shared control channel and at least one identification of at least one addressed mobile terminal, and the base station comprises means for sending frequency selective shared control channel signaling information for said at least one addressed mobile terminal at the indicated position of said at least one OFDM symbol or subcarrier of the frequency selective shared control channel.

In OFDM based systems with a frequency selective scheduling algorithm, the base station BS1-BS8 needs sufficient information about the channel quality in each usable part of the spectrum. This is done by sending this information from the mobile terminal T1-T4 to the base station BS1-BS8 via a feedback channel. To perform the channel quality estimation the mobile terminal T1-T4 measures OFDM symbols or subcarriers at known, possibly equidistant frequency positions with a permanent coded signal on them. At these OFDM symbols or subcarriers the mobile terminal T1-T4 permanently evaluates the quality measure. The parts of the spectrum that were not evaluated explicitly, are estimated by applying an appropriate interpolation scheme.

A method for a resource saving control channel scheduling is described in the following making reference to FIG. 2.

Figure 2:
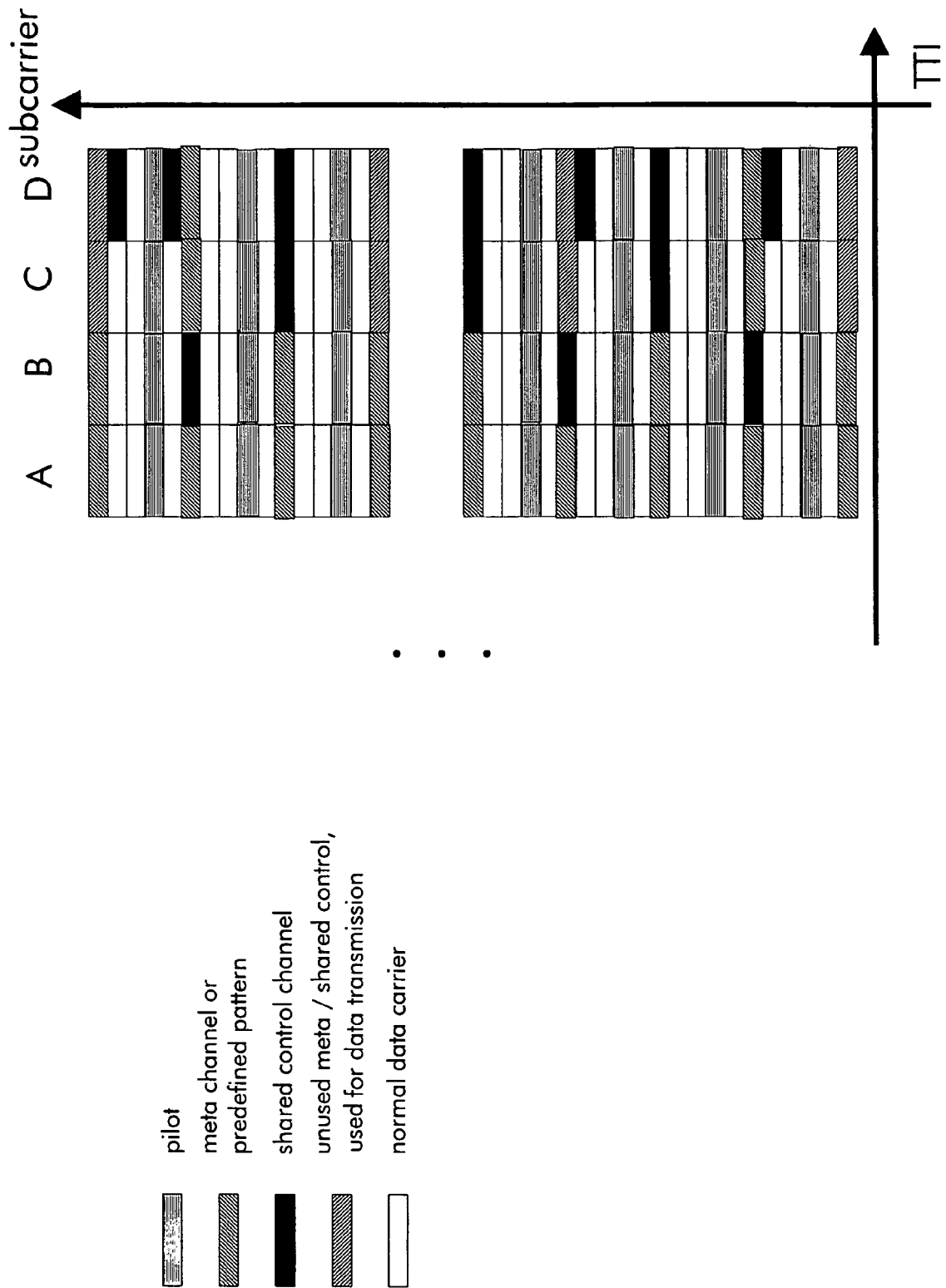
FIG. 2 schematically shows the different use of subcarriers in several steps of the method according to the invention.

In FIG. 2, the frequency band, i.e. the OFDM spectrum is subdivided into subcarriers along the frequency axis which is denoted with the word subcarrier. The time axis denoted TTI is subdivided into 5 transmission time intervals A-D, each of them showing a different usage mode of the multitude of subcarriers.

The subcarriers that are used as pilots are depicted by a box with vertical lines. The subcarriers that carry signaling information common to all mobile terminals T1-T4 or that carry a predefined pattern are depicted by a box with lines from the upper left side to the lower right side. The subcarriers that carry signaling information common to all mobile terminals T1-T4 are summarized in a channel that is referred to as a meta channel in the following. The subcarriers that belong to a frequency selective shared control channel are depicted by black boxes. Unused subcarriers belonging to a meta channel or to a frequency selective shared control channel that are used for data transmission are depicted by a box with lines from the lower left side to the upper right side. The subcarriers that are used for data transmission in the normal way are depicted by white boxes.

The transmission time intervals are preferably subdivided into several OFDM symbols. In the example depicted in FIG. 2, for the sake of simplicity all OFDM symbols belonging to one transmission time interval are used for the same purpose, however it is also possible that the various OFDM symbols of a transmission time interval are differently used. It is e.g. possible that signaling is performed only in the first OFDM symbol of a transmission time interval and that the other OFDM symbols are used e.g. for data transmission.

In a first step of the method according to the invention which is depicted in FIG. 2, in the transmission time interval denoted with A, the base station BS1-BS8 broadcasts on the meta channel signaling information common to all mobile terminals indicating the position of at least one OFDM symbol or subcarrier of at least one frequency selective shared control channel and at least one identification of at least one addressed mobile terminal. This signaling information preferably has a robust modulation scheme like e.g. Bipolar Phase Shift Keying (BPSK) or Quadrature Phase Shift Keying (QPSK) and will be used by the mobile terminals T1-T4 for a first channel quality estimation. The OFDM symbols or subcarriers used for the meta channel must be predefined and known to the mobile terminals T1-T4.

In a second step depicted in FIG. 2 in the transmission time interval denoted with B, the base station BS1-BS8 sends signaling information for an addressed mobile terminal at the indicated position of said at least one OFDM symbol or subcarrier of said at least one frequency selective shared control channel. This signaling information also preferably has a robust modulation scheme like e.g. BPSK or QPSK and will be used for channel quality estimation by at least one mobile terminal T1-T4.

In an embodiment, the positions of said at least one OFDM symbol or subcarrier of said at least one frequency selective shared control channel are defined in such a way that said at least one mobile terminal T1-T4 measures OFDM symbols or subcarriers at equidistant or nearly equidistant frequency positions for channel quality estimation.

In another embodiment, the signaling information common to all mobile terminals is sent on an equidistant or nearly equidistant frequency grid, said signaling information common to all mobile terminals is used for channel quality estimation, and in case of unused radio resources on said frequency grid, said at least one frequency selective shared control channel uses said unused radio resources. This scenario is depicted in the transmission time interval denoted with B. Here, it is shown that the frequency selective shared control channel uses subcarriers that have been used for the meta channel in the previous transmission time interval denoted with A.

In another embodiment, parts of the OFDM spectrum with OFDM symbols or subcarriers that are not measured for channel quality estimation are estimated by applying an interpolation scheme.

Depending on the amount of addressed, i.e. scheduled mobile terminals, the number of OFDM symbols or subcarriers used for the signaling information is variable. Thus, in an embodiment, unused equidistant or nearly equidistant OFDM symbols or subcarriers are preferably used for data transmission in order to guarantee a quasi-permanently coded signal for channel quality estimation, i.e. for data transmission the scheduler within the base station should prefer unused equidistant or nearly equidistant OFDM symbols or subcarriers. This scenario is depicted in FIG. 2. Here, it is shown that subcarriers that have been used for sending signaling information on a shared control channel, i.e. the meta channel or a frequency selective shared control channel in the transmission time interval denoted with B are used for data transmission in the transmission time interval denoted with C.

In another embodiment, in OFDM symbols or subcarriers at equidistant or nearly equidistant frequency positions that are not filled with signaling information common to all mobile terminals, frequency selective shared control channel signaling information or data, a predefined pattern is sent in said OFDM symbols or subcarriers. This procedure allows for periodic coded signals which is preferred for channel quality estimation.

In another embodiment, if the meta channel and frequency selective shared control channel signaling information carried in a first transmission time interval is valid for several consecutive transmission time intervals, at least one transmission time interval subsequent to said first transmission time interval carries only data and pilots, and said data are distributed on equidistant or nearly equidistant frequency positions for channel quality estimation. This scenario is also referred to as TTI concatenation. The scheduler in the base station ensures that the data is distributed to preferably all of the above mentioned equidistant or nearly equidistant frequency positions and that a robust modulation scheme is applied.

In another embodiment, the OFDM symbols or subcarriers at equidistant or nearly equidistant frequency positions used for channel quality estimation are located near pilot OFDM symbols or subcarriers to minimize the error probability of signaling information.

To distinguish the current use of OFDM symbols or subcarriers for meta channel signaling, frequency selective shared control channel signaling, data transmission or predefined patterns, a special signaling header of the meta channel of e.g. 2 bits is preferably introduced.

For frequency diversity reasons, the choice of the OFDM symbols or subcarriers for meta channel and frequency selective shared control channel signaling has to be optimised in such a way, that a mobile terminal gets frequency selective shared control channel signaling preferably on OFDM symbols or subcarriers with a good channel quality.

In an embodiment, depending on the amount of signaling information in the frequency selective shared control channel, the number of OFDM symbols or subcarriers used for the frequency selective shared control channel is variable. In order to get maximum efficiency depending on the channel conditions of the mobile terminals that are scheduled in a certain transmission time interval, the frequency selective scheduler uses OFDM symbols or subcarriers, that were previously unused or used for data transmission, for the frequency selective shared control channel. Thus, additional OFDM symbols or subcarriers are used for the frequency selective shared control channel even if they do not belong to the frequency grid of the meta channel. This scenario is depicted in FIG. 2. Here, it is shown that subcarriers that have been used for data transmission in the transmission time interval denoted with C are used for transmission of the frequency selective shared control channel in the transmission time interval denoted with D.

The invention claimed is:

1. A method for performing frequency selective control channel scheduling in networks using an Orthogonal Frequency Division Multiplexing (OFDM) spectrum, comprising:
at a base station, broadcasting on at least one predefined OFDM symbol or subcarrier which is known to all mobile terminals a signaling information common to all mobile terminals indicating a position of at least one OFDM symbol or subcarrier of at least one frequency selective shared control channel and at least one identification of at least one addressed mobile terminal;
sending from the base station signaling information for said at least one addressed mobile terminal at the indicated position of said at least one OFDM symbol or subcarrier of said at least one frequency selective shared control channel; and
measuring at least one mobile terminal at least one OFDM symbol or subcarrier of said at least one frequency selective shared control channel for channel quality estimation;
wherein the positions of said at least one OFDM symbol or subcarrier of said at least one frequency selective shared control channel are defined in such a way that said at least one mobile terminal measures OFDM symbols or subcarriers at equidistant frequency positions for channel quality estimation;
wherein unused equidistant OFDM symbols or subcarriers are used for data transmission in order to guarantee a quasi-permanently coded signal for channel quality estimation; and
wherein a predefined pattern is sent in OFDM symbols or subcarriers at equidistant frequency positions that are not filled with signaling information common to all mobile terminals, frequency selective shared control channel signaling information or data.

2. The method according to claim 1, wherein the signaling information common to all mobile terminals is sent on an equidistant frequency grid, that said signaling information common to all mobile terminals is used for channel quality estimation, and that in case of unused radio resources on said frequency grid, said at least one frequency selective shared control channel uses said unused radio resources.

3. The method according to claim 1, wherein parts of the OFDM spectrum with OFDM symbols or subcarriers that are not measured for channel quality estimation are estimated by applying an interpolation scheme.

4. The method according to claim 1, wherein the OFDM symbols or subcarriers at equidistant frequency positions are located near pilot subcarriers to minimize the error probability of signaling information.

5. The method according to claim 1, wherein if the frequency selective shared control channel signaling information carried in a first transmission time interval is valid for several consecutive transmission time intervals, at least one transmission time interval subsequent to said first transmission time interval carries only data and pilots, and said data are distributed on equidistant frequency positions for channel quality estimation.

6. A mobile terminal for performing frequency selective channel quality estimation in networks using an Orthogonal Frequency Division Multiplexing (OFDM) spectrum, comprising:
means for evaluating a signaling information common to all mobile terminals broadcast by a base station indicating a position of at least one OFDM symbol or subcarrier of a frequency selective shared control channel and at least one identification of at least one addressed mobile terminal; and
means for measuring said at least one OFDM symbol or subcarrier of said frequency selective shared control channel for channel quality estimation;
wherein the positions of said at least one OFDM symbol or subcarrier of said at least one frequency selective shared control channel are defined in such a way that said at least one mobile terminal measures OFDM symbols or subcarriers at equidistant frequency positions for channel quality estimation;
wherein unused equidistant OFDM symbols or subcarriers are used for data transmission in order to guarantee a quasi-permanently coded signal for channel quality estimation; and wherein at least one of:
a predefined pattern is sent in OFDM symbols or subcarriers at equidistant frequency positions that are not filled with signaling information common to all mobile terminals, frequency selective shared control channel signaling information or data; and
the OFDM symbols or subcarriers at equidistant frequency positions are located near pilot subcarriers to minimize the error probability of signaling information.

7. The mobile terminal according to claim 6, wherein the signaling information common to all mobile terminals is sent on an equidistant frequency grid, that said signaling information common to all mobile terminals is used for channel quality estimation, and that in case of unused radio resources on said frequency grid, said at least one frequency selective shared control channel uses said unused radio resources.

8. The mobile terminal according to claim 6, wherein parts of the OFDM spectrum with OFDM symbols or subcarriers that are not measured for channel quality estimation are estimated by applying an interpolation scheme.

9. The mobile terminal according to claim 6, wherein if the frequency selective shared control channel signaling information carried in a first transmission time interval is valid for several consecutive transmission time intervals, at least one transmission time interval subsequent to said first transmission time interval carries only data and pilots, and said data are distributed on equidistant frequency positions for channel quality estimation.

10. A base station for performing frequency selective control channel scheduling in networks using an Orthogonal Frequency Division Multiplexing (OFDM) spectrum, comprising:
  means for broadcasting on at least one OFDM symbol or subcarrier a signaling information common to all mobile terminals indicating a position of at least one OFDM symbol or subcarrier of a frequency selective shared control channel and at least one identification of at least one addressed mobile terminal; and
  means for sending frequency selective shared control channel signaling information for said at least one addressed mobile terminal at the indicated position of said at least one OFDM symbol or subcarrier of the frequency selective shared control channel;
  wherein the positions of said at least one OFDM symbol or subcarrier of said at least one frequency selective shared control channel are defined in such a way that said at least one mobile terminal measures OFDM symbols or subcarriers at equidistant frequency positions for channel quality estimation;
  wherein unused equidistant or nearly equidistant OFDM symbols or subcarriers are used for data transmission in order to guarantee a quasi-permanently coded signal for channel quality estimation; and wherein at least one of:
  a predefined pattern is sent in OFDM symbols or subcarriers at equidistant frequency positions that are not filled with signaling information common to all mobile terminals, frequency selective shared control channel signaling information or data; and
  the OFDM symbols or subcarriers at equidistant frequency positions are located near pilot subcarriers to minimize the error probability of signaling information.

11. The base station according to claim 10, wherein the signaling information common to all mobile terminals is sent on an equidistant frequency grid, that said signaling information common to all mobile terminals is used for channel quality estimation, and that in case of unused radio resources on said frequency grid, said at least one frequency selective shared control channel uses said unused radio resources.

12. The base station according to claim 10, wherein if the frequency selective shared control channel signaling information carried in a first transmission time interval is valid for several consecutive transmission time intervals, at least one transmission time interval subsequent to said first transmission time interval carries only data and pilots, and said data are distributed on equidistant frequency positions for channel quality" estimation.

13. A network using an Orthogonal Frequency Division Multiplexing (OFDM) spectrum comprising base stations each comprising:
  means for broadcasting on at least one OFDM symbol or subcarrier a signaling information common to all mobile terminals indicating a position of at least one OFDM symbol or subcarrier of a frequency selective shared control channel and at least one identification of at least one addressed mobile terminal; and
  the base station further comprising means for sending frequency selective shared control channel signaling information for said at least one addressed mobile terminal at the indicated position of said at least one OFDM symbol or subcarrier of the frequency selective shared control channel and said network further including at least one mobile terminal;
  wherein the positions of said at least one OFDM symbol or subcarrier of said at least one frequency selective shared control channel are defined in such a way that said at least one mobile terminal measures OFDM symbols or subcarriers at equidistant frequency positions for channel quality estimation;
  wherein unused equidistant OFDM symbols or subcarriers are used for data transmission in order to guarantee a quasi-permanently coded signal for channel quality estimation; and wherein at least one of:
  a predefined pattern is sent in OFDM symbols or subcarriers at equidistant frequency positions that are not filled with signaling information common to all mobile terminals, frequency selective shared control channel signaling information or data; and
  the OFDM symbols or subcarriers at equidistant or frequency positions are located near pilot subcarriers to minimize the error probability of signaling information.

14. The network according to claim 13, wherein the signaling information common to all mobile terminals is sent on an equidistant frequency grid, that said signaling information common to all mobile terminals is used for channel quality estimation, and that in case of unused radio resources on said frequency grid, said at least one frequency selective shared control channel uses said unused radio resources.

15. The network according to claim 13, wherein if the frequency selective shared control channel signaling information carried in a first transmission time interval is valid for several consecutive transmission time intervals, at least one transmission time interval subsequent to said first transmission time interval carries only data and pilots, and said data are distributed on equidistant frequency positions for channel quality estimation.

* * * * *